(12) United States Patent
Mattingly, III et al.

(10) Patent No.: US 7,171,090 B2
(45) Date of Patent: Jan. 30, 2007

(54) LOW ATTENUATION OPTICAL FIBER

(75) Inventors: William Brashear Mattingly, III, Painted Post, NY (US); Snigdharaj Kumar Mishra, Wilmington, NC (US); Lu Zhang, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 63 days.

(21) Appl. No.: 11/174,048

(22) Filed: Jun. 30, 2005

(65) Prior Publication Data

US 2007/0003199 A1    Jan. 4, 2007

(51) Int. Cl.
*G02B 6/02* (2006.01)
*G02B 6/028* (2006.01)
*G02B 6/036* (2006.01)

(52) U.S. Cl. .................. 385/124; 385/123; 385/126; 385/127

(58) Field of Classification Search ............... 385/123, 385/126, 127
See application file for complete search history.

(56) References Cited

U.S. PATENT DOCUMENTS

| | | | |
|---|---|---|---|
| 6,185,353 B1* | 2/2001 | Yamashita et al. | 385/124 |
| 6,490,396 B1* | 12/2002 | Smith | 385/123 |
| 6,885,802 B2* | 4/2005 | Oliveti et al. | 385/123 |
| 6,928,211 B2* | 8/2005 | Tanigawa et al. | 385/24 |

OTHER PUBLICATIONS

"Analysis of Scattering from the Fiber Waveguide with Irregular Core Surfaces" E.G. Rawson, Applied Optics, Vo. 13, No. 10, Oct. 1974, pp. 2370-2377.
"Measurement of the Angular Distribution of Light Scattered from a Glass Fiber Optical Waveguide" E.G. Rawson, Applied Optics, vol. 11, No. 11, Nov. 1972, pp. 2477-2481.
"Explanation of Anomalous Loss in High Delta Singlemode Fibres" M.E. Lines, W.A. Reed, D.J. DiGiovanni and J.R. Hamblin, Electronic Letters, Jun. 10, 1999, vol. 35, No. 12, pp. 1009-1010.
"Preparation and Characteristics of 850nm-Optimized Single-Mode Optical Fiber" Honghai Wang, Feng Tu, Optical Fibers and Passive Components, vol. 5279, (SPIE, Bellingham, WA, 2004), pp. 34-39.

* cited by examiner

*Primary Examiner*—Frank G. Font
*Assistant Examiner*—Erin D. Chiem
(74) *Attorney, Agent, or Firm*—Svetlana Z. Short

(57) ABSTRACT

An optical waveguide fiber comprises: (a) a core with a refractive index profile having, a radius, an alpha and a relative refractive index characterized by delta % that varies along the radius; (b) at least one cladding surrounding the core; wherein the alpha is less than 2.5, peak refractive index delta % is between 0.34% and 0.4%, the relative refractive index is less than 0.01% for all radii greater than 7 μm, and this optical waveguide fiber has a mode field diameter MFD at a wavelength of 1310 nm of no more than 9.54 μm, and attenuation less than: (a) 0.329 dB/km at a wavelength of 1310 nm, (b) 0.290 dB/km at a wavelength of 1383 nm, (c) 0.255 dB/km at a wavelength of 1410 nm, and (d) 0.189 dB/km at a wavelength of 1550 nm.

20 Claims, 4 Drawing Sheets

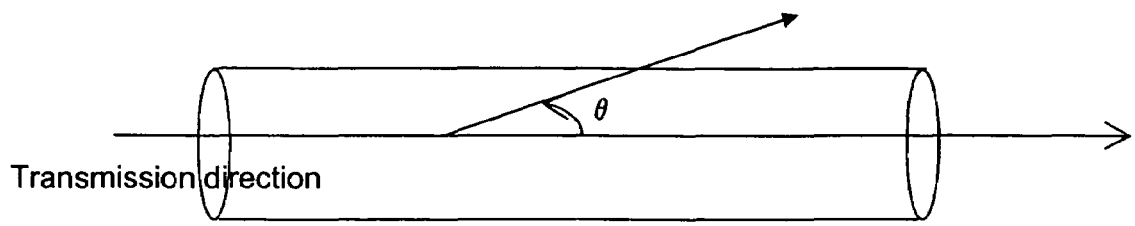
Figure 3: Schematic of scattering in the fiber
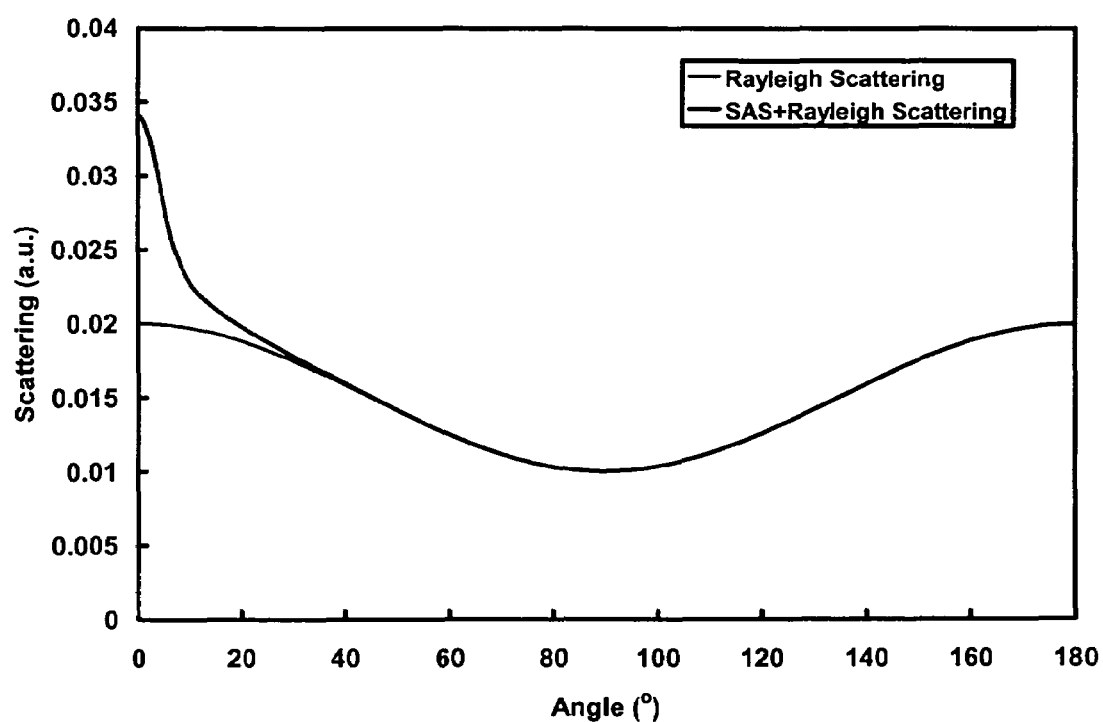
Figure 4 Comparison between Rayleigh Scattering and combination of Small Angle Scattering and Rayleigh Scattering in optical fibers.

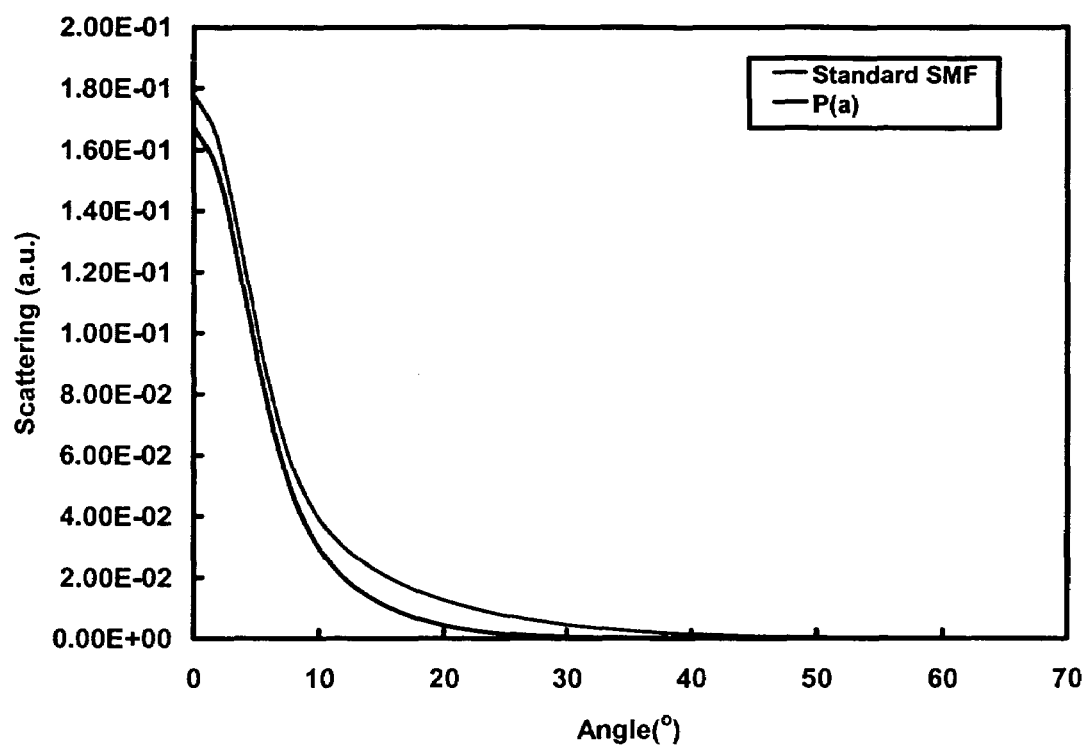
Figure 5: Comparison of scattering angle distribution of standard SMF-28® and Profile(a) at 1550nm

LOW ATTENUATION OPTICAL FIBER

BACKGROUND OF THE INVENTION

1. Field of the Invention

The present invention relates generally to optical fibers, and particularly to optical fibers with low attenuation and low Small Angle Scattering (SAS) loss.

2. Technical Background

Telecommunication systems, for the underground and undersea applications in particular, require optical fiber which is capable of transmitting signals for a long distance without degradation. The appearance of new technologies, such as wavelength division multiplexing (WDM) and high channel speed, makes possible to satisfy the ever-growing demand for network bandwidth. However, the optical fiber attributes such as attenuation and bend loss contribute to the degradation of the signal.

US patent publication 2003/0161597 discloses an optical fiber capable of multi mode operation at wavelengths below 1300 nm and single mode operation at wavelengths above 1300 nm. The publication describes that this optical fiber has reduced intermodal noise, but is silent with regard to overall attenuation and Small Angle Scattering (SAS) loss.

The article by Rawson E. G., entitled "Measurement of the Angular Distribution of Light Scattered from a Glass Fiber Optical Waveguide", App. Opt. 11, 2477 (1972) describes the measurement of angular distribution of a near-forward scattering, and proposes that it is caused by narrow dielectric needles aligned with the fiber axis.

The article by Rawson E. G., entitled "Analysis of Scattering from Fiber Waveguide with Irregular Core Surfaces", App. Opt. 13, 2370 (1974) describes an induced-dipole scattering method and presents the results of the angular distribution of scattering for five types of perturbations on the core-cladding interface of the optical fiber.

The article by Lines, M. E., Reed W. A., Di Giovanni D. J. and Hamblin J. R., entitled "Explanation of Anomalous Loss in High Delta Single mode Fibers", Ele. Lett., 35, 1009 (1999) describes the angular dependence of anomalous scattering is caused by fluctuation of refractive index of the material along axial and azimuthal directions. The loss is predicted to be related the fiber profile peak and profile shape.

SUMMARY OF THE INVENTION

According to one aspect of the invention, an optical waveguide fiber comprises:

a core with a refractive index profile having, a radius, an alpha and a relative refractive index characterized by delta % that varies along the radius; and at least one cladding surrounding the core;

wherein the alpha is less than 2.5, peak refractive index delta % in said core is between 0.34% and 0.4%, the relative refractive index is less than 0.01% for all radii greater than 7 μm, and this optical waveguide fiber has a mode field diameter MFD at a wavelength of 1310 nm of no more than 9.54 μm, and attenuation less than: (a) 0.329 dB/km at a wavelength of 1310 nm, (b) 0.290 dB/km at a wavelength of 1383 nm, (c) 0.255 dB/km at a wavelength of 1410 nm, and (d) 0.189 dB/km at a wavelength of 1550 nm.

According to some of the embodiments, the optical waveguide fiber has attenuation that is less than: (a) 0.322 dB/km at a wavelength of 1310 nm, (b) 0.270 dB/km at a wavelength of 1383 nm; (c) 0.247 dB/km at a wavelength of 1410 nm, and (d) 0.179 dB/km attenuation at a wavelength of 1550 nm.

According to some embodiments, the optical waveguide fiber comprises:

(a) a core with a refractive index profile having, a radius, an alpha and a relative refractive index that varies along said radius; and at least one cladding surrounding the core; wherein the relative refractive index (delta %) is less than 0.01% for all radii greater than 6 μm, and this optical waveguide fiber has a mode field diameter MFD at a wavelength of 1310 nm of less than 9.4 μm.

One advantage of this fiber is that it has low attenuation and low small angle scattering (SAS). Because of the low attenuation and/or low SAS losses, this optical waveguide fiber can either eliminate or reduce the number of signal amplifiers needed for a network, which can reduce the cost of the network.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 3 illustrates schematically Small Angle Scattering (SAS) of an optical waveguide fiber.

FIG. 4 is a graph of two different types of scattering intensity as a function of scattering angle in optical waveguide fiber.

FIG. 5 is a graph of scattering intensity as a function of scattering angle in two different fiber types.

DETAILED DESCRIPTION OF THE PREFERRED EMBODIMENTS

Figure 1:
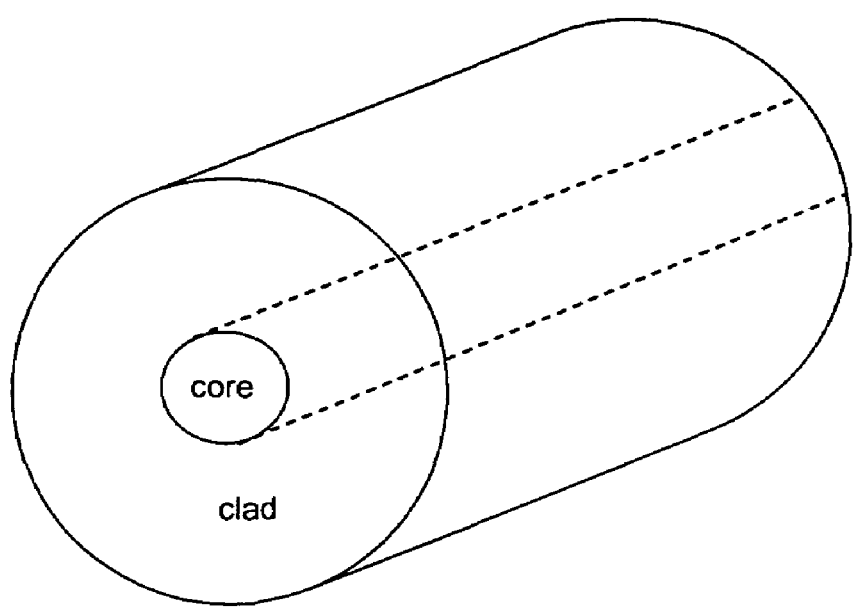
FIG. 1 illustrates schematically one embodiment of the optical waveguide fiber.

Reference will now be made in detail to the present preferred embodiments of the invention, examples of which are illustrated in the accompanying drawings. Whenever possible, the same reference numerals will be used throughout the drawings to refer to the same or like parts. One embodiment of the optical fiber waveguide of the present invention is shown in FIG. 1, and is designated generally throughout by the reference numeral 10.

Figure 2A:
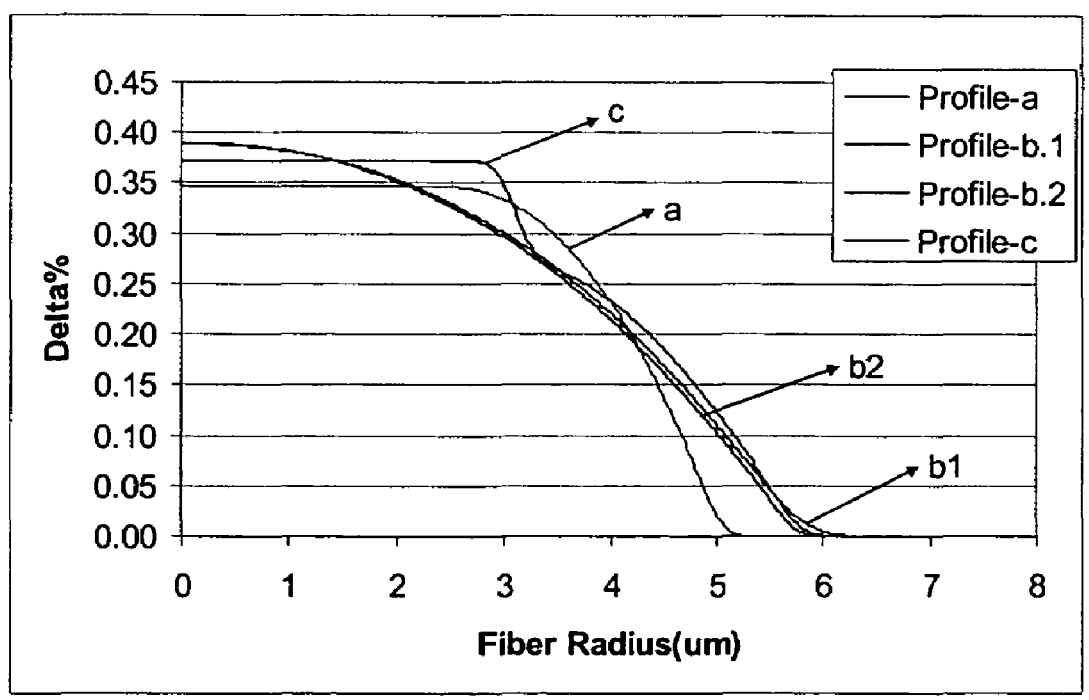
FIGS. 2a–2c are refractive index profiles of exemplary optical fibers according to some of the embodiments of the present invention.
Figure 2B:
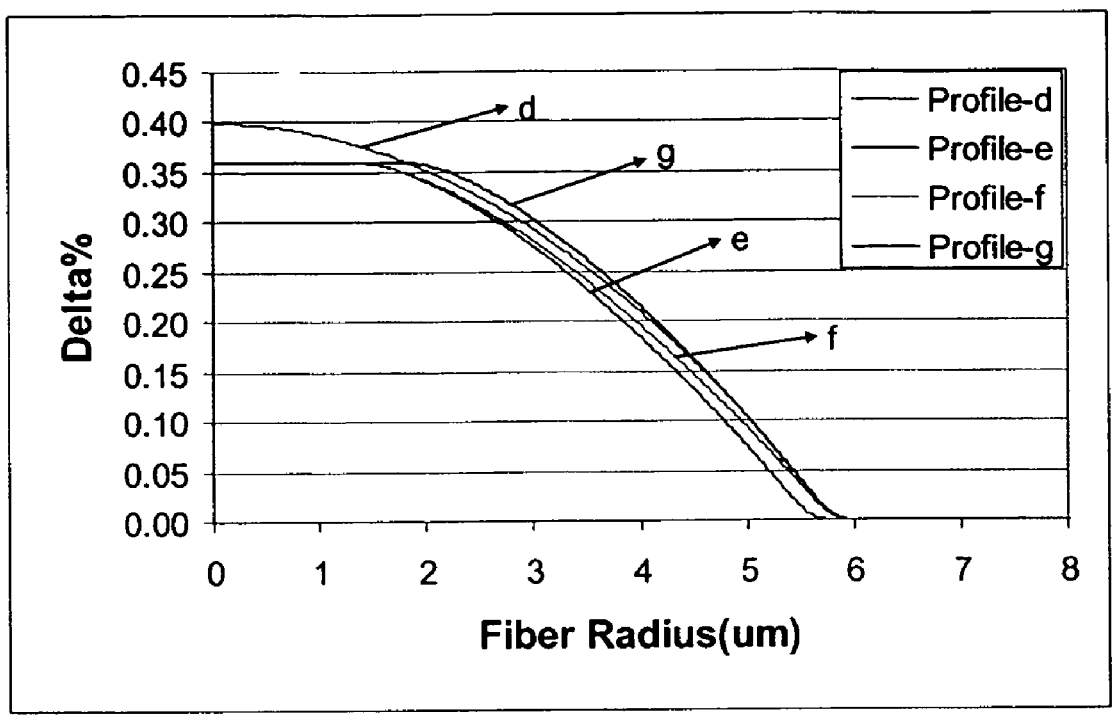
Figure 2C:
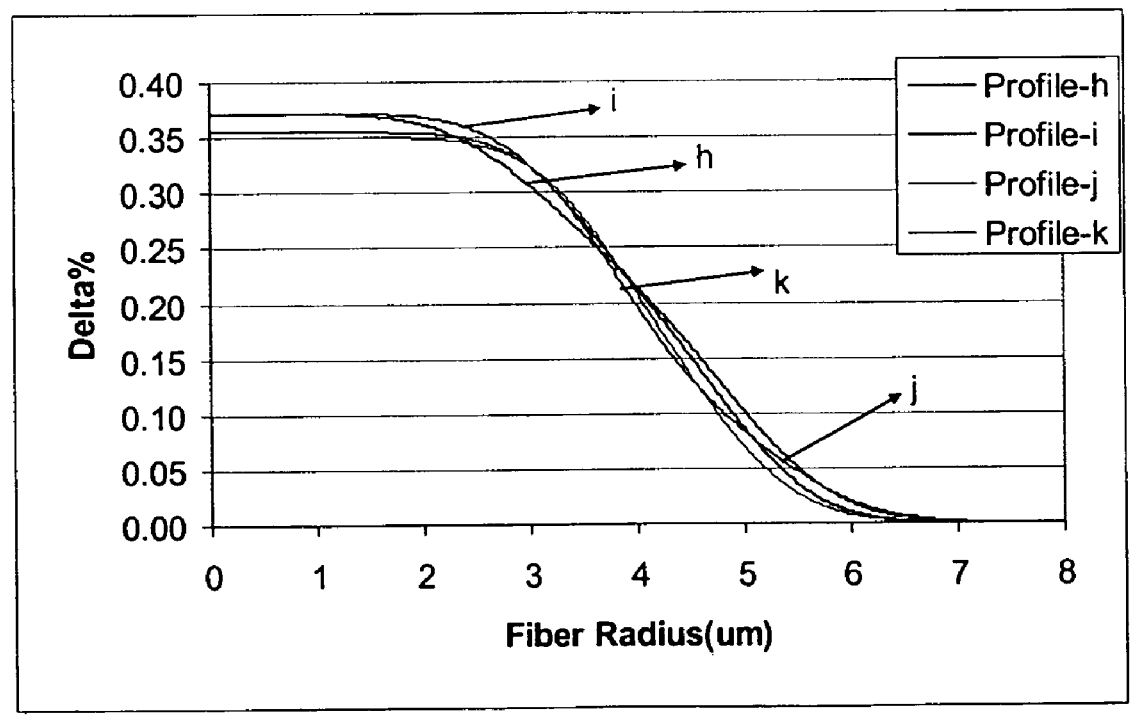

In accordance with the invention the optical waveguide fiber includes a core 12 and at least one cladding 14 surrounding the core 12. In these exemplary embodiments the cladding 14 is pure silica and the silica core 12 is doped with Ge to obtain the desired change in relative refractive index (3.5–4.2 mole % of Ge). The diameter of the core 12 varies from 9 μm to 16 μm. The outer diameter of the cladding 14 of these exemplary optical fibers 10 is about 125 μm. The exemplary refractive index fiber profiles of these optical waveguide fibers 10 are depicted in FIGS. 2a–2c (profiles a–k). More specifically, in these figures, the vertical axes correspond to the delta % (relative to that of pure silica cladding) and the horizontal axes correspond to fiber radius. The core Delta % of these optical fibers 10 corresponding to FIGS. 2a–2c is defined as $$\Delta = \frac{(n(r)^2 - n_0^2)}{2n(r)^2} \times 100,$$

where $n_0$ is the refractive index of the cladding 14 and n is the refractive index of the core 12, at a radial distance r away from the centerline. It is noted that neither fluorine doping nor germanium up-doping in the cladding are required to achieve these fiber profiles.

The Delta % values corresponding to profiles (a)–(k) shown in FIGS. 2a–2c are given in Tables 1a and 1b, below.

TABLE 1a

|  |  | a | b.1 | b.2 | c | d | e |
|---|---|---|---|---|---|---|---|
| Delta (r = 0) | % | 0.348 | 0.389 | 0.389 | 0.372 | 0.399 | 0.360 |
| Delta (r = 0.5) | % | 0.348 | 0.387 | 0.388 | 0.372 | 0.396 | 0.360 |
| Delta (r = 1) | % | 0.348 | 0.381 | 0.381 | 0.372 | 0.387 | 0.360 |
| Delta Max | % | 0.348 | 0.389 | 0.389 | 0.372 | 0.399 | 0.360 |
| r (Delta Max) | um | 0.000 | 0.000 | 0.000 | 0.000 | 0.000 | 0.000 |
| Delta (r = 1.5 um) | % | 0.348 | 0.370 | 0.369 | 0.372 | 0.372 | 0.358 |
| Delta (r = 2 um) | % | 0.348 | 0.353 | 0.352 | 0.372 | 0.351 | 0.340 |
| Delta (r = 2.5 um) | % | 0.347 | 0.330 | 0.327 | 0.372 | 0.325 | 0.311 |
| Delta (r = 3 um) | % | 0.334 | 0.301 | 0.297 | 0.349 | 0.292 | 0.275 |
| Delta (r = 3.5 um) | % | 0.296 | 0.264 | 0.259 | 0.264 | 0.254 | 0.232 |
| Delta (r = 4 um) | % | 0.232 | 0.221 | 0.214 | 0.233 | 0.210 | 0.184 |
| Delta (r = 4.5 um) | % | 0.140 | 0.170 | 0.162 | 0.186 | 0.160 | 0.132 |
| Delta (r = 5 um) | % | 0.022 | 0.111 | 0.103 | 0.124 | 0.104 | 0.074 |
| Delta (r = 5.5 um) | % | 0.000 | 0.046 | 0.036 | 0.047 | 0.042 | 0.014 |
| Delta (r = 6 um) | % | 0.000 | 0.004 | 0.000 | 0.001 | 0.000 | 0.000 |
| Delta (r = 6.5 um) | % | 0.000 | 0.000 | 0.000 | 0.000 | 0.000 | 0.000 |
| Delta (r = 7 um) | % | 0.000 | 0.000 | 0.000 | 0.000 | 0.000 | 0.000 |
| Delta (r = 7.5 um) | % | 0.000 | 0.000 | 0.000 | 0.000 | 0.000 | 0.000 |
| Delta (r = 8 um) | % | 0.000 | 0.000 | 0.000 | 0.000 | 0.000 | 0.000 |

TABLE 1b

|  |  | f | g | h | i | j | k |
|---|---|---|---|---|---|---|---|
| Delta (r = 0) | % | 0.360 | 0.360 | 0.372 | 0.372 | 0.355 | 0.350 |
| Delta (r = 0.5) | % | 0.360 | 0.360 | 0.372 | 0.372 | 0.355 | 0.350 |
| Delta (r = 1) | % | 0.360 | 0.360 | 0.371 | 0.372 | 0.355 | 0.350 |
| Delta Max | % | 0.360 | 0.360 | 0.372 | 0.372 | 0.355 | 0.350 |
| r (Delta Max) | um | 0.000 | 0.000 | 0.000 | 0.000 | 0.000 | 0.000 |
| Delta (r = 1.5 um) | % | 0.358 | 0.360 | 0.369 | 0.371 | 0.355 | 0.350 |
| Delta (r = 2 um) | % | 0.342 | 0.357 | 0.361 | 0.368 | 0.354 | 0.349 |
| Delta (r = 2.5 um) | % | 0.315 | 0.336 | 0.341 | 0.355 | 0.347 | 0.343 |
| Delta (r = 3 um) | % | 0.281 | 0.303 | 0.306 | 0.324 | 0.323 | 0.323 |
| Delta (r = 3.5 um) | % | 0.241 | 0.263 | 0.262 | 0.273 | 0.270 | 0.278 |
| Delta (r = 4 um) | % | 0.196 | 0.215 | 0.214 | 0.213 | 0.197 | 0.209 |
| Delta (r = 4.5 um) | % | 0.147 | 0.162 | 0.160 | 0.150 | 0.131 | 0.134 |
| Delta (r = 5 um) | % | 0.093 | 0.103 | 0.102 | 0.087 | 0.084 | 0.070 |
| Delta (r = 5.5 um) | % | 0.036 | 0.040 | 0.051 | 0.036 | 0.047 | 0.027 |
| Delta (r = 6 um) | % | 0.000 | 0.000 | 0.019 | 0.010 | 0.020 | 0.007 |
| Delta (r = 6.5 um) | % | 0.000 | 0.000 | 0.005 | 0.002 | 0.006 | 0.001 |
| Delta (r = 7 um) | % | 0.000 | 0.000 | 0.001 | 0.000 | 0.001 | 0.000 |
| Delta (r = 7.5 um) | % | 0.000 | 0.000 | 0.000 | 0.000 | 0.000 | 0.000 |
| Delta (r = 8 um) | % | 0.000 | 0.000 | 0.000 | 0.000 | 0.000 | 0.000 |

The optical fibers 10 are relatively easy to manufacture because of the simplicity of the refractive index profiles. These optical waveguide fibers 10 have low attenuation compared to Corning's SMF-28® and the bending loss similar to that of Corning's SMF-28®.

According to some of the embodiments of the present invention an optical waveguide fiber 10 comprises: a core 12 with a refractive index profile having, a radius, an alpha and a relative refractive index characterized by delta % that varies along said radius; at least one cladding 14 surrounding the core 12; wherein the alpha is less than 2.5 and the peak refractive index delta % is between 0.34% and 0.4%.

It is preferable that the refractive index delta % is less than 0.01% for all radii greater than 7 μm. In these embodiments of the optical waveguide fiber 10 the mode field diameter MFD at a wavelength of 1310 nm is no more than 9.54 μm (and preferably less than 9.5 μm), and attenuation less than: (a) 0.329 dB/km at a wavelength of 1310 nm, (b) 0.290 dB/km at a wavelength of 1383 nm, (c) 0.255 dB/km at a wavelength of 1410 nm, and (d) 0.189 dB/km at a wavelength of 1550 nm. In some embodiments MFD diameter at 1310 nm was in the 8.9 μm to 9.4 μm range. It is preferable that the optical waveguide fiber 10 has attenuation that is less than: (a) 0.322 dB/km at a wavelength of 1310 nm, (b) 0.275 dB/km (and preferably less than 0.270) at a wavelength of 1383 nm; (c) 0.247 dB/km at a wavelength of 1410 nm, and (d) 0.179 dB/km attenuation at a wavelength of 1550 nm.

The optical waveguide fibers 10 have low attenuation and small Small Angle Scattering (SAS), at least in part due to their low-alpha profiles (i.e., alpha less than 2.5). The low-alpha profiles produce a gradual change of refractive index, which contributes to decreased loss due to Small Angle Scattering (SAS).

The Small Angle Scattering (SAS) of the exemplary fibers 10 (profiles a–k) is less than 0.006 dB/kin at the wavelength of 1550 nm. It is more preferable that SAS is less than 0.002 dB/km at the wavelength of 1550 nm. It is preferable that the SAS be less than 0.0081 dB/km and more preferably less than 0.0025 dB/km at the wavelength of 1300 nm. It is preferable that the SAS be less than 0.007 dB/km and more preferably less than 0.002 dB/km at the wavelength of 1400 nm.

The bend resistance of an optical waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of the optical waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of an optical waveguide fiber to bending. To perform this test, attenuation loss is measured for a waveguide fiber with essentially no induced bending loss. The optical waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the optical waveguide fiber conform to a portion of the pin surface.

It is preferable that the optical waveguide fiber 10 has Pin Array macrobend loss of less than 20 dB, and more preferable less than 10 dB, at the wavelength of 1550 nm. It is also preferable that the optical waveguide fiber 10 has a Lateral Load macrobend loss of less than 1.2 dB/m, more preferably less than 0.7 dB/m at the wavelength of 1550 nm.

In the optical fiber 10 of the above described embodiments the Stimulated Brillouin Scattering Threshold (SBSt) is higher than 8.2 dBm. It is preferable that SBSt be higher than 8.5 dBm. In some of the embodiments SBSt was 9.68 dBm. The SBSt values are specified for fiber length of 20 km. It is also preferable that the optical waveguide fiber has PMD of less than 0.1 ps/sqrt(km).

The calculated optical performances parameters for exemplary optical fibers with profiles (a) through (k) (corresponding to FIGS. 2a–2c) are summarized in Table 2.

TABLE 2

| Profile | λo (nm) | MFD @ 1330 nm (μm) | D @ 1550 nm (ps/(nm.km)) | Dispersion slope @ 1550 nm (ps/(nm².km)) | Effective Area @ 1550 nm (μm²) | Cable Cutoff (nm) | Attenuation at 1550 nm (dB/km) |
|---|---|---|---|---|---|---|---|
| a | 1310 | 9.20 | 16.85 | 0.058 | 83 | 1180 | 0.1874 |
| $b_1$ | 1314 | 9.29 | 16.96 | 0.060 | 84 | 1220 | 0.1852 |
| $b_2$ | 1316 | 9.25 | 16.73 | 0.059 | 83 | 1198 | 0.1853 |
| c | 1308 | 9.23 | 17.39 | 0.059 | 83 | 1261 | 0.1863 |
| d | 1318 | 9.23 | 16.61 | 0.060 | 83 | 1194 | 0.1852 |
| e | 1323 | 9.29 | 16.01 | 0.059 | 85 | 1117 | 0.1855 |
| f | 1319 | 9.37 | 16.48 | 0.060 | 87 | 1156 | 0.1852 |
| g | 1313 | 9.34 | 16.97 | 0.059 | 85 | 1206 | 0.1856 |
| h | 1314 | 9.29 | 16.92 | 0.060 | 84 | 1222 | 0.1855 |
| i | 1314 | 9.16 | 16.84 | 0.059 | 82 | 1217 | 0.1863 |
| j | 1314 | 9.29 | 16.77 | 0.059 | 85 | 1200 | 0.1862 |
| k | 1313 | 9.29 | 16.81 | 0.059 | 85 | 1187 | 0.1864 |

The additional optical parameters corresponding to the optical waveguide fibers with fiber profiles (a)–(k) are listed in Tables 3a and 3b, along with the Corning® SMF-28® attributes, for comparison. The optical waveguide fiber 10 of the embodiments depicted in FIGS. 2a–2c have about 0.00258–0.00481 dB/km lower attenuation at a wavelength of 1550 nm, compared to SMF-28®.

TABLE 3a

| units | Lambda 0 nm | slope 0 ps/nm^2-km | MFD 1310 um | F. Cutoff nm | C. Cutoff nm | Aeff 1310 um^2 |
|---|---|---|---|---|---|---|
| SMF-28 | 1302-1322 | <0.0924 | 8.85–9.55 | <1360 | <1260 | |
| A | 1309.8 | 0.08686 | 9.204 | 1280 | 1180 | 65.965 |
| b.1 | 1313.9 | 0.08912 | 9.294 | 1320 | 1220 | 65.907 |
| b.2 | 1316.0 | 0.08892 | 9.251 | 1298 | 1198 | 65.178 |
| C | 1308.2 | 0.08876 | 9.233 | 1360 | 1261 | 65.871 |
| D | 1318.0 | 0.08917 | 9.227 | 1294 | 1194 | 64.659 |
| E | 1322.9 | 0.08817 | 9.286 | 1217 | 1117 | 65.308 |
| F | 1318.6 | 0.08865 | 9.374 | 1256 | 1156 | 66.717 |
| G | 1312.6 | 0.08854 | 9.343 | 1306 | 1206 | 66.876 |
| H | 1314.3 | 0.08896 | 9.294 | 1322 | 1222 | 65.978 |
| I | 1313.5 | 0.08828 | 9.162 | 1317 | 1217 | 64.501 |
| J | 1314.4 | 0.08821 | 9.296 | 1300 | 1200 | 66.344 |
| K | 1312.5 | 0.08769 | 9.289 | 1287 | 1187 | 66.539 |

TABLE 3b

| units | D 1550 ps/nm-km | slope 1550 ps/nm^2-km | MFD 1550 um | Attn 1550 dB/km | Microbend 1550 dB/m | Macrobend 1550 dB | Aeff 1550 um^2 |
|---|---|---|---|---|---|---|---|
| a | 16.8509 | 0.0583 | 10.463 | 0.18742 | 0.595 | 10.002 | 83.125 |
| b.1 | 16.9634 | 0.0601 | 10.591 | 0.18524 | 0.569 | 8.096 | 84.215 |
| b.2 | 16.7342 | 0.0599 | 10.566 | 0.18533 | 0.616 | 9.439 | 83.680 |
| c | 17.3956 | 0.0597 | 10.446 | 0.18631 | 0.349 | 4.404 | 82.656 |
| d | 16.6125 | 0.0601 | 10.556 | 0.18519 | 0.621 | 9.622 | 83.365 |
| e | 16.0124 | 0.0597 | 10.711 | 0.18548 | 1.104 | 20.928 | 85.494 |
| f | 16.4803 | 0.0599 | 10.763 | 0.18521 | 0.989 | 16.508 | 86.530 |
| g | 16.9750 | 0.0597 | 10.645 | 0.18565 | 0.660 | 9.768 | 85.231 |
| h | 16.9180 | 0.0601 | 10.596 | 0.18553 | 0.575 | 8.104 | 84.309 |
| i | 16.8420 | 0.0595 | 10.430 | 0.18630 | 0.461 | 6.837 | 81.962 |
| j | 16.7753 | 0.0597 | 10.613 | 0.18618 | 0.668 | 10.080 | 84.728 |
| k | 16.8146 | 0.0592 | 10.590 | 0.18645 | 0.682 | 10.858 | 84.602 |

The optical waveguide fiber with profile b was measured and the optical parameters are provided in the following two tables:

TABLES 4 and 5

|  | Attenuation at 1310 nm (dB/km) | Attenuation at 1383 nm (dB/km) | Attenuation at 1410 nm (dB/km) | Attenuation at 1550 nm (dB/km) | Attenuation at 1625 nm (dB/km) | MFD at 1310 (µm) | Lambda 0 (nm) | Cable Cutoff (nm) |
|---|---|---|---|---|---|---|---|---|
| Example 1 | 0.321 | 0.274 | 0.246 | 0.178 | 0.191 | 8.961 | 1318.0 | 1205.1 |
| Example 2 | 0.326 | 0.262 | 0.247 | 0.186 | 0.200 | 9.195 | 1315.7 | 1209.4 |
| Example 3 | 0.323 | 0.278 | 0.249 | 0.181 | 0.193 | 9.079 | 1316.0 | 1207.8 |
| Total data set of 86 reels of fiber | | | | | | | | |
| Min | 0.321 | 0.259 | 0.246 | 0.178 | 0.191 | 8.891 | 1315.0 | 1178.1 |
| Max | 0.332 | 0.293 | 0.258 | 0.193 | 0.206 | 9.406 | 1321.4 | 1260.5 |
| Average | 0.328 | 0.279 | 0.253 | 0.187 | 0.200 | 9.145 | 1317.0 | 1216.6 |

Corning® SMF-28® single-mode optical waveguide fiber is one of most widely deployed fibers. This fiber has a relatively small attenuation, which is mainly comes due to Rayleigh scattering. It is widely known that Rayleigh scattering has $(1+\cos^2\theta)$ distribution, where, $\theta$ is the scattering angle, as shown in FIG. 3. There is also excess scattering between 0 and 60°, which is called Small Angle Scattering (SAS), which is also shown in FIG. 3. Small Angle Scattering could be caused by the non-uniform fiber profile variation along the transmission length. The presence of the small angle scattering is not desirable. It increases the total attenuation of the fiber. The optical waveguide fibers corresponding to profiles (a)–(k) depicted in FIGS. 2a–2c are single mode fibers that have very similar optical properties to those of Corning® SMF-28®, but significantly lower Small Angle Scattering.

The SAS value of these optical waveguide fibers 10 is calculated as follows:

The fiber profile can be expressed as:

$n(r, a) = n_0 + f(r, a)$, where, $n_0$ is the index of cladding, a is the radius of core, n is the index of the core, and f can be any function, then we define the parameter $\epsilon = n^2$ which relates to the perturbation at core-cladding interface. Any perturbation at core-cladding interface, defined as $d\epsilon/da$, will cause small angle scattering.

The scattering field E can be calculated from the changes along the axial and azimuthal directions as $G(z)$, and $T(\phi)$, respectively, by the following equation:

$$E = F(\lambda) \int \int \int E^0(r) G(z) T(\phi) H(r,z,\phi) d\epsilon r dr d\phi dz$$

where, $F(\epsilon)$ is a function of wavelength, $E^0(r)$ is the incident field; $H(r,z,\phi)$ is the phase difference of scattering from different locations of the optical waveguide fiber 10.

The scattering power is defined as $\Gamma = A(\lambda) E \cdot E^*$, where $A(\lambda)$ is the function of wavelength, and $E^*$ is the conjugate of scattering field E and the total optical power due to scattering from SAS is an be calculated by the following equation $$P = 2\pi \int_0^\pi \Gamma(\theta) \sin\theta \, d\theta$$

This equation was utilized to calculate SAS values for Corning® SMF-28™ optical fiber and for the optical waveguide fibers 10 described above. FIG. 4 shows a comparison of scattering curves (scattering data at the wavelength of 1550 nm) between Corning® SMF-28® and one embodiment of the optical waveguide fiber 10.

It can be seen that this new design has lower magnitude of scattering and the range of scattering angle is smaller. Both lead to smaller total scattering loss. Table 6 lists the calculated SAS, at different wavelengths, for Corning® SMF-28® and ten embodiments of the optical waveguide fibers 10 corresponding to refractive index profiles on FIGS. 2a–2c.

TABLE 6

| Profile | SAS @ 1300 nm (dB/km) | SAS @ 1400 nm (dB/km) | SAS @ 1550 nm (dB/km) | SAS @ 1600 nm (dB/km) |
|---|---|---|---|---|
| a | 0.016 | 0.013 | 0.011 | 0.010 |
| b1 | 0.004 | 0.004 | 0.003 | 0.003 |
| d | 0.004 | 0.003 | 0.003 | 0.003 |
| e | 0.004 | 0.004 | 0.003 | 0.003 |
| f | 0.004 | 0.003 | 0.003 | 0.003 |
| g | 0.004 | 0.004 | 0.003 | 0.003 |
| h | 0.010 | 0.009 | 0.007 | 0.007 |
| I | 0.012 | 0.010 | 0.008 | 0.008 |
| j | 0.011 | 0.009 | 0.008 | 0.007 |
| k | 0.012 | 0.010 | 0.008 | 0.008 |
| SMF-28 ® | 0.028 | 0.024 | 0.020 | 0.018 |

Table 7 lists the SAS values which are normalized by the SAS value of the SMF-28® fiber at the same wavelength, (where SAS of is SMF-28® is assumed to b 1)

TABLE 7

| profile | SAS @ 1300 nm | SAS @ 1400 nm | SAS @ 1550 nm | SAS @ 1600 nm |
|---|---|---|---|---|
| a | 0.55 | 0.55 | 0.56 | 0.57 |
| b1 | 0.15 | 0.15 | 0.16 | 0.16 |
| d | 0.14 | 0.14 | 0.15 | 0.15 |
| e | 0.15 | 0.15 | 0.16 | 0.16 |
| f | 0.14 | 0.14 | 0.14 | 0.14 |
| g | 0.15 | 0.16 | 0.16 | 0.16 |
| h | 0.36 | 0.37 | 0.37 | 0.38 |
| I | 0.41 | 0.42 | 0.43 | 0.43 |
| j | 0.39 | 0.39 | 0.40 | 0.40 |
| k | 0.42 | 0.43 | 0.43 | 0.44 |
| SMF-28 ® | 1 | 1 | 1 | 1 |

Table 8 lists the SAS values of each optical waveguide fiber (profiles (a)–(k)), when the SAS value of SMF-28® fiber is 0.1 dB/km at 1550 mm. All of these optical waveguide fiber (profiles (a)–(k)) have lower SAS, compared with that of SMF-28®, as shown in Tables 6–8. The highest SAS value corresponds to profile (a), with SAS value of about 57% of that of SMF-28®. The lowest SAS values correspond to profiles d, e and f, and are only about 20% or less (at 1550 nm) than that of SMF-28®.

TABLE 8

| profile | SAS @ 1300 nm (dB/km) | SAS @ 1400 nm (dB/km) | SAS @ 1550 nm (dB/km) | SAS @ 1600 nm (dB/km) |
|---|---|---|---|---|
| a | 0.05 | 0.06 | 0.06 | 0.06 |
| b1 | 0.02 | 0.02 | 0.02 | 0.02 |
| d | 0.01 | 0.01 | 0.01 | 0.01 |
| e | 0.02 | 0.02 | 0.02 | 0.02 |
| f | 0.01 | 0.01 | 0.01 | 0.01 |
| g | 0.02 | 0.02 | 0.02 | 0.02 |
| h | 0.04 | 0.04 | 0.04 | 0.04 |
| I | 0.04 | 0.04 | 0.04 | 0.04 |
| j | 0.04 | 0.04 | 0.04 | 0.04 |
| k | 0.04 | 0.04 | 0.04 | 0.04 |
| SMF-28 ® | 0.15 | 0.12 | 0.10 | 0.09 |

In the wavelength range discussed herein (1300–1600 nm), SAS value decays with wavelength, proportionally to $1/\lambda^p$, where p is the power index of the wavelength. The SAS values of the SMF-28® fiber decay as $$\frac{1}{\lambda^{2.143}}.$$

The decay rate of optical waveguide fibers 10 corresponding to the profiles (a)–(k) described herein is slower than that of the SMF-28® fiber, the values p are listed in Table 9, below.

TABLE 9

| Fiber profile | Power Index p |
|---|---|
| a | 1.996 |
| b1 | 1.983 |
| d | 1.979 |
| e | 1.988 |
| f | 1.983 |
| g | 1.988 |
| h | 1.962 |
| I | 1.967 |
| j | 1.967 |
| k | 1.974 |

The power indexes p (shown in Table 9) of the optical fiber 10 shave smaller values than that of SMF-28® fiber (i.e., smaller than 2.143), which implies that small angle scattering decays slower than that of SMF-28® fiber. This means the SAS of the optical fibers 10 changes more gradually than that of standard SMF-28® fiber, implying smaller SAS, which leads to lower overall fiber attenuation.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical waveguide fiber comprising comprising:
    a core with a refractive index profile having, a radius, an alpha and a relative refractive index characterized by delta % that varies along said radius;
    at least one cladding surrounding said core;
    wherein said alpha is less than 2.5, peak refractive index delta % in said core is between 0.34% and 0.4%, said relative refractive index is less than 0.01% for all radii greater than 7 μm, and said optical waveguide fiber having a mode field diameter MFD at a wavelength of 1310 nm of no more than 9.54 μm, and attenuation less than: (a) 0.329 dB/km at a wavelength of 1310 nm, (b) 0.290 dB/km at a wavelength of 1383 nm, (c) 0.255 dB/km at a wavelength of 1410 nm, and (d) 0.189 dB/km at a wavelength of 1550 nm.

2. The optical waveguide fiber according to claim 1, wherein said MFD is 9.2 μm to 9.4 μm, said optical waveguide fiber having zero dispersion wavelength between a 1309 nm and 1323 nm.

3. The optical waveguide fiber according to claim 2, wherein said attenuation is not higher than: 0.322 dB/km at a wavelength of 1310 nm, and 0.179 dB/km at a wavelength of 1550 nm.

4. The optical waveguide fiber according to claim 3, wherein said attenuation is not higher than: 0.270 dB/km at a wavelength of 1383 nm, 0.247 dB/km at a wavelength of 1410 nm.

5. The optical waveguide fiber according to claim 1, wherein said attenuation is not higher than: 0.322 dB/km at a wavelength of 1310 nm, and 0.179 dB/km at a wavelength of 1550 nm.

6. The optical waveguide fiber according to claim 1, wherein said attenuation is not higher than: 0.270 dB/km at a wavelength of 1383 nm, 0.247 dB/km at a wavelength of 1410 mm.

7. The optical waveguide fiber according to claim 1, wherein said attenuation is less than: (a) 0.322 dB/km at a wavelength of 1310 nm, (b) 0.270 dB/km at a wavelength of 1383 nm; (c) 0.247 dB/km at a wavelength of 1410 nm, and (d) 0.179 dB/km attenuation at a wavelength of 1550 nm.

8. The optical waveguide fiber according to claim 1, wherein Small Angle Scattering (SAS) is less than 0.006 dB/km at the wavelength of 1550 nm.

9. The optical waveguide fiber according to claim 8, wherein Small Angle Scattering (SAS) is less than 0.002 dB/km at the wavelength of 1550 nm.

10. The optical waveguide fiber according to claim 1, wherein Small Angle Scattering (SAS) is less than 0.0081 dB/km at the wavelength of 1300 nm.

11. The optical waveguide fiber according to claim 10, wherein Small Angle Scattering (SAS) is no more than 0.0025 dB/km at the wavelength of 1300 nm.

12. The optical waveguide fiber according to claim 1, wherein Small Angle Scattering (SAS) is less than 0.007 dB/km at the wavelength of 1400 nm.

13. The optical waveguide fiber according to claim 12, wherein Small Angle Scattering (SAS) is no more than 0.002 dB/km at the wavelength of 1400 nm.

14. The optical waveguide fiber according to claim 1, wherein said optical waveguide fiber has PinArray macrobend loss of less than 20 dB at the wavelength of 1550 nm.

15. The optical waveguide fiber according to claim 14, wherein said optical waveguide fiber has PinArray macrobend loss of less than 10 dB at the wavelength of 1550 nm.

16. The optical waveguide fiber according to claim 1, wherein said optical waveguide fiber has Lateral Load microbend loss of less than 1.2 dB/m at the wavelength of 1550 nm.

17. The optical waveguide fiber according to claim 16, wherein said optical waveguide fiber has Lateral Load microbend loss of less than 0.7 dB/m at the wavelength of 1550 nm.

18. The optical waveguide fiber according to claim 1, wherein said optical waveguide fiber has a Stimulated Brillouin Scattering Threshold (SBSt) of higher than 8.5 dBm.

19. The optical waveguide fiber according to claim 1, wherein said optical waveguide fiber has a Stimulated Brillouin Scattering Threshold (SBSt) between 8.2 dBm and 9.68 dBm.

20. The optical waveguide fiber according to claim 1, wherein said optical waveguide fiber has PMD of less than 0.1 ps/sqrt(km).

* * * * *